US009009850B2

(12) United States Patent
Vedabrata et al.

(10) Patent No.: US 9,009,850 B2
(45) Date of Patent: Apr. 14, 2015

(54) DATABASE MANAGEMENT BY ANALYZING USAGE OF DATABASE FIELDS

(75) Inventors: Arya Kumar Vedabrata, Orissa (IN); Jangaiah Kranti Kurva, Andhra Pradesh (IN); Chandra Shekar Katuri, Andhra Pradesh (IN)

(73) Assignee: Bank of America Corporation, Charlotte, NC (US)

( * ) Notice: Subject to any disclaimer, the term of this patent is extended or adjusted under 35 U.S.C. 154(b) by 214 days.

(21) Appl. No.: 13/532,176

(22) Filed: Jun. 25, 2012

(65) Prior Publication Data

US 2013/0347127 A1   Dec. 26, 2013

(51) Int. Cl.
*G06F 21/62* (2013.01)
*G06F 21/55* (2013.01)
*G06F 17/30* (2006.01)

(52) U.S. Cl.
CPC ......... *G06F 21/6227* (2013.01); *G06F 21/552* (2013.01); *G06F 17/30289* (2013.01)

(58) Field of Classification Search
CPC ....... G06F 17/3005; G06F 7/02; G06F 17/30; G06F 17/30286; H04L 63/102; H04L 41/024; G11B 27/32; H04N 7/16
USPC ......... 726/28, 29, 27, 2, 7; 707/103, 3, 2, 102
See application file for complete search history.

(56) References Cited

U.S. PATENT DOCUMENTS

| | | | |
|---|---|---|---|
| 3,662,400 A * | 5/1972 | Geil ....................................... 1/1 |
| 5,542,072 A * | 7/1996 | Kawashima et al. ................. 1/1 |
| 6,363,386 B1 * | 3/2002 | Soderberg et al. ............ 707/769 |
| 6,973,500 B1 * | 12/2005 | Yamamoto et al. ........... 709/229 |
| 7,406,460 B2 * | 7/2008 | Burrows ................................ 1/1 |
| 7,546,312 B1 * | 6/2009 | Xu et al. ............................... 1/1 |
| 7,574,426 B1 * | 8/2009 | Ortega .................................. 1/1 |
| 8,037,299 B2 * | 10/2011 | Becker Hof .................. 713/155 |
| 8,650,210 B1 * | 2/2014 | Cheng et al. .................. 707/770 |
| 2002/0116474 A1 * | 8/2002 | Copeland et al. ............. 709/219 |
| 2002/0147887 A1 * | 10/2002 | Copeland et al. ............. 711/118 |
| 2002/0152278 A1 * | 10/2002 | Pontenzone et al. .......... 709/217 |
| 2003/0074671 A1 * | 4/2003 | Murakami et al. ............ 725/109 |
| 2004/0073630 A1 * | 4/2004 | Copeland et al. ............. 709/218 |
| 2004/0205061 A1 * | 10/2004 | Nakazato et al. ................. 707/3 |
| 2005/0239445 A1 * | 10/2005 | Karaoguz et al. .......... 455/414.1 |
| 2007/0133763 A1 * | 6/2007 | D'Angelo et al. ......... 379/93.02 |
| 2008/0059422 A1 * | 3/2008 | Tenni et al. ....................... 707/3 |
| 2008/0065602 A1 * | 3/2008 | Cragun et al. .................... 707/3 |
| 2008/0066078 A1 * | 3/2008 | Rathod et al. ................. 719/311 |
| 2009/0055372 A1 * | 2/2009 | Kim et al. ......................... 707/4 |

(Continued)

OTHER PUBLICATIONS

Aboda et al., "The Network Access Identifier", RFC 2486, 1999.*

(Continued)

*Primary Examiner* — O. C. Vostal
(74) *Attorney, Agent, or Firm* — Banner & Witcoff, Ltd.; Michael A. Springs (57) ABSTRACT

Apparatuses, computer readable media, methods, and systems are described for accessing table layout data identifying a plurality of fields included in a table stored in a database, accessing log data identifying a number of times each of the fields of the table has been queried, ranking the fields based on the number of times each of the fields of the table has been queried, determining a first subset of the fields that have not been queried at least a predetermined number of times, and generating an update to the table by removing the first subset of the fields from the table.

19 Claims, 7 Drawing Sheets

(56) References Cited

U.S. PATENT DOCUMENTS

| | | | |
|---|---|---|---|
| 2009/0276419 A1* | 11/2009 | Jones et al. | 707/5 |
| 2010/0299692 A1* | 11/2010 | Rao et al. | 725/14 |
| 2010/0332560 A1* | 12/2010 | Gerbasi, III | 707/812 |
| 2011/0040752 A1* | 2/2011 | Svore et al. | 707/728 |
| 2011/0060733 A1* | 3/2011 | Peng et al. | 707/723 |
| 2011/0231381 A1* | 9/2011 | Mercuri | 707/706 |
| 2012/0171649 A1* | 7/2012 | Wander et al. | 434/247 |
| 2012/0215740 A1* | 8/2012 | Vaillant et al. | 707/634 |
| 2012/0290551 A9* | 11/2012 | Ghosh | 707/706 |
| 2013/0055094 A1* | 2/2013 | Monahan et al. | 715/738 |
| 2013/0162753 A1* | 6/2013 | Hendrickson et al. | 348/14.08 |

OTHER PUBLICATIONS

Rigney et al., "Remote Authentication Dial in User Service (RADIUS)", RFC 2138, 1997.*

Capachietti, "QuickBooks 2011 The Offical eGuide for Premier Edition Users", 2011.*

Rowlands, "Informational retrieval through textual annotations", 2012.*

General SQL Parser: sql engine for various databases, http://www.sqlparser.com/howto.php, copyright 2001-2011 sqlparser.com, 2 pages.

* cited by examiner

| 402 | 404 | 406 | 408 | 410 | 412 |
|---|---|---|---|---|---|
| DF_1_1 | Metadata for DF_1_1 | DF_1_2 | Metadata for DF_1_2 | DF_1_3 | Metadata for DF_1_3 |
| DF_2_1 | Metadata for DF_2_1 | DF_2_2 | Metadata for DF_2_2 | DF_2_3 | Metadata for DF_2_3 |
| DF_3_1 | Metadata for DF_3_1 | DF_3_2 | Metadata for DF_3_2 | DF_3_3 | Metadata for DF_3_3 |
| DF_4_1 | Metadata for DF_4_1 | DF_4_2 | Metadata for DF_4_2 | DF_4_3 | Metadata for DF_4_3 |
| DF_5_1 | Metadata for DF_5_1 | DF_5_2 | Metadata for DF_5_2 | DF_5_3 | Metadata for DF_5_3 |
| DF_6_1 | Metadata for DF_6_1 | DF_6_2 | Metadata for DF_6_2 | DF_6_3 | Metadata for DF_6_3 |

| Department (502) | Query Count (504) | Cumulative Count (506) |
|---|---|---|
| Department 1 | 2345 | 2345 |
| Department 2 | 2316 | 4661 |
| Department 3 | 1570 | 6231 |
| Department 4 | 963 | 7194 |
| Department 5 | 598 | 7792 |
| Department 6 | 597 | 8389 |
| Department 7 | 520 | 8909 |
| Department 8 | 415 | 9324 |
| Department 9 | 293 | 9617 |

FIG. 5

| Department User | Query Count | Cumulative Count | Percentage | Cumulative Percentage |
|---|---|---|---|---|
| User 1 | 921 | 921 | 7.5 | 7.5 |
| User 2 | 863 | 1784 | 7.03 | 14.53 |
| User 3 | 834 | 2618 | 6.79 | 21.32 |
| User 4 | 598 | 3216 | 4.87 | 26.19 |
| User 5 | 597 | 3813 | 4.86 | 31.05 |
| User 6 | 513 | 4326 | 4.16 | 35.23 |

FIG. 6

| DB Table | Query Count | Cumulative Count | Percentage | Cumulative Percentage |
|---|---|---|---|---|
| Table 1 | 5570 | 5570 | 45.35 | 45.35 |
| Table 2 | 1500 | 7070 | 12.21 | 57.57 |
| Table 3 | 752 | 7822 | 6.13 | 63.69 |
| Table 4 | 720 | 8542 | 5.86 | 69.55 |
| Table 5 | 692 | 9234 | 5.63 | 75.19 |

Access table layout data identifying a plurality of fields included in a table
902

Access log data identifying a number of times each of the fields of the table has been queried
904

Rank the fields based on the number of time each of the fields of the table has been queried
906

Determine a first subset of the fields that have not been queried at least a predetermined number of times
908

Generate an update to the table based on the first subset
910

FIG. 9

DATABASE MANAGEMENT BY ANALYZING USAGE OF DATABASE FIELDS

BACKGROUND

A database is an organized collection of data stored in one or more tables each including multiple fields. Due to the size of some databases, queries run against databases may be time and resource consumptive. Moreover, databases often store metadata that contains information describing data stored in the data fields. Metadata may become difficult to manage if there are a large number of data fields. Maintaining data security can also be an issue for databases. In view of such issues, improvements in database management and data security are needed.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

According to aspects of example embodiments, apparatuses, computer readable media, methods, and systems are described for database management by analyzing usage of database fields.

In some aspects, apparatuses, computer readable media, methods, and systems are described for accessing table layout data identifying a plurality of fields included in a table stored in a database, accessing log data identifying a number of times each of the fields of the table has been queried, and ranking the fields based on the number of times each of the fields of the table has been queried. In some additional aspects, apparatuses, computer readable media, methods, and systems are described for determining a first subset of the fields that have not been queried at least a predetermined number of times, and generating an update to the table by removing the first subset of the fields from the table.

Aspects of the embodiments may be provided in at least one computer-readable medium and/or memory storing computer-readable instructions that, when executed by at least one processor, cause a computer or other apparatus to perform one or more of the operations described herein.

These and other aspects of the embodiments are discussed in greater detail throughout this disclosure, including the accompanying drawings.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure.

Figure 1:
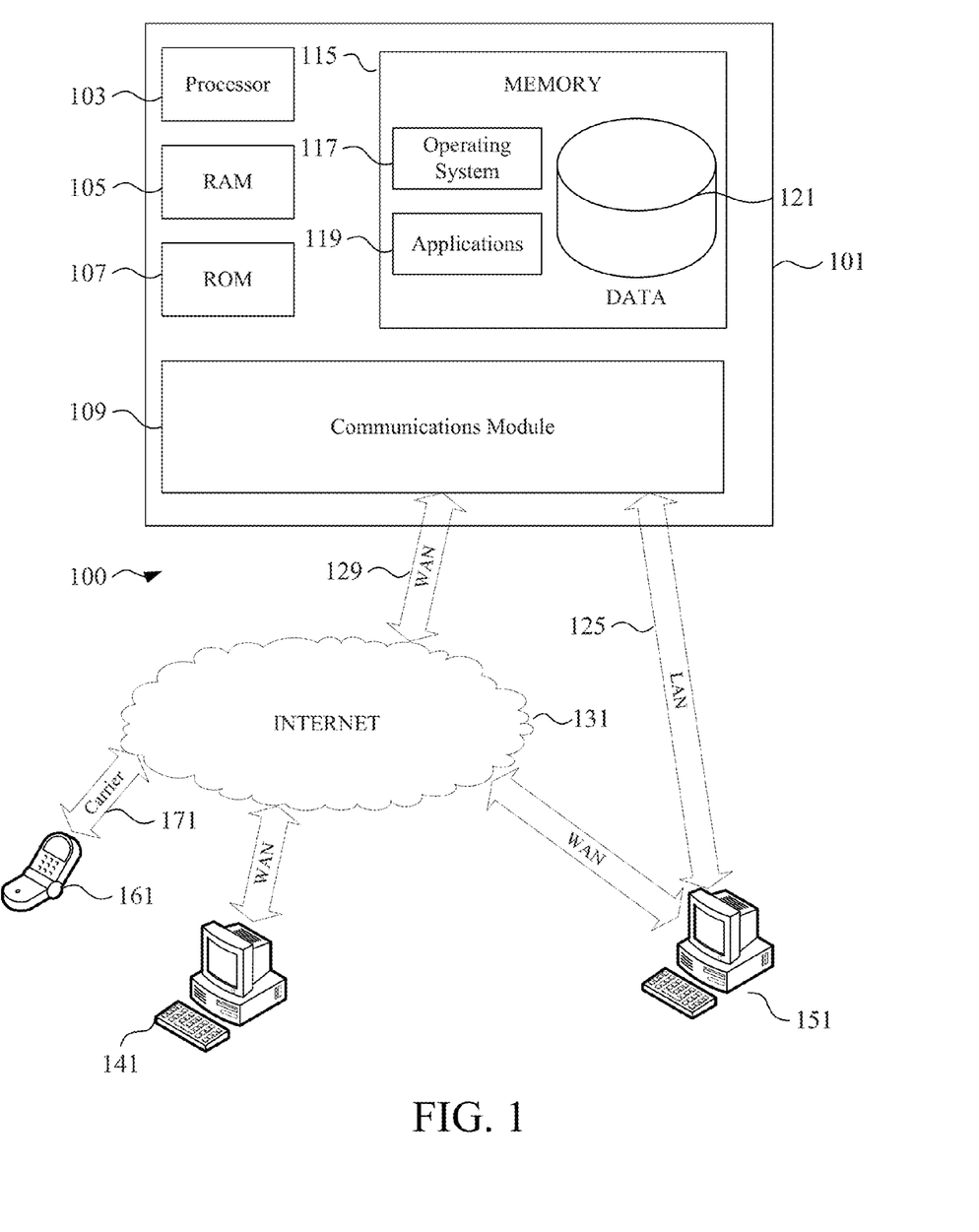
FIG. 1 shows an illustrative operating environment in which various aspects of the present disclosure may be implemented, in accordance with example embodiments.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

With reference to FIG. 1, the computing system environment 100 may include a computing device 101 having a processor 103 for controlling overall operation of the computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-readable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-readable instructions stored on a computer-readable medium.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Also, some or all of the computer readable instructions for computing device 101 may be embodied in hardware or firmware. Although not shown, RAM 105 may include one or more are applications representing the application data stored in RAM 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. The computing devices 141, 151, and 161 may be personal computing devices or servers that include many or all of the elements described above relative to the computing device 101. Computing device 161 may be a mobile device (e.g., smart phone) communicating over wireless carrier channel 171.

The network connections depicted in FIG. 1 may include a local area network (LAN) 125 and a wide area network (WAN) 129, as well as other networks. When used in a LAN networking environment, computing device 101 may be connected to the LAN 125 through a network interface or adapter in the communications module 109. When used in a WAN networking environment, computing device 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
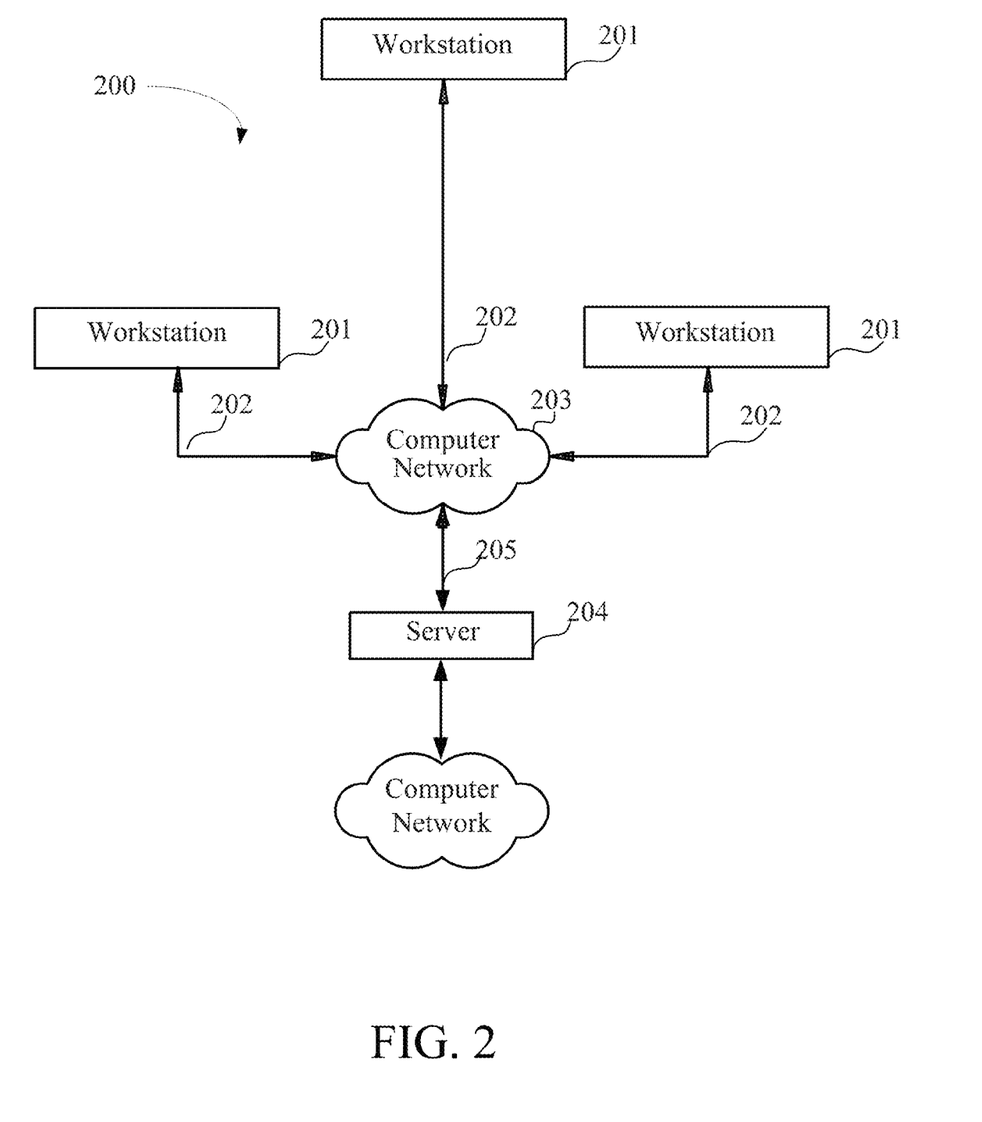
FIG. 2 is an illustrative block diagram of workstations and servers that may be used to implement the processes and functions of certain aspects of the present disclosure, in accordance with example embodiments.

Referring to FIG. 2, an illustrative system 200 for implementing example embodiments according to the present disclosure is shown. As illustrated, system 200 may include one or more workstation computers 201. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
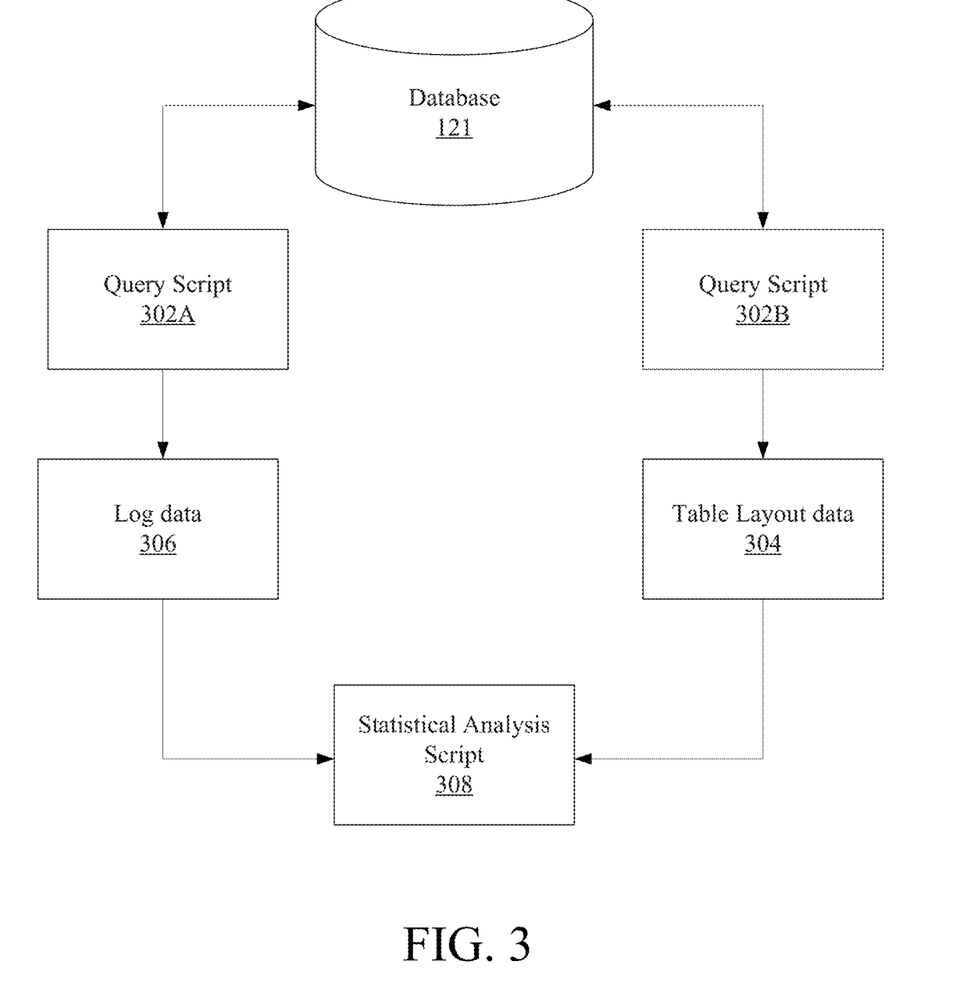
FIG. 3 illustrates an example process flow diagram for analyzing tables of a database, in accordance with example embodiments.

FIG. 3 illustrates an example process flow diagram for analyzing tables of a database, in accordance with example embodiments. There are several aspects to consider when managing data stored in a database, including data quality, metadata, data security, and data storage. Data quality may be a measure of completeness of the data, compliance with formats for the data, and accuracy of the data. Metadata may be a description of data elements stored in fields of the database. Data security may relate to limiting access to data stored in a database to select individuals. Data storage may relate to determining where data currently is stored, and where data should be stored. Rather than relying on hunches for managing data stored in a database, the example embodiments provide for database management that may account for data quality, metadata, data security, and data storage.

Computing device 101 may periodically execute one or more query scripts 302 to obtain information from database 121 about one or more database tables. For example, computing device 101 may issue a first query script 302A to retrieve log data 306 and a second query script 302B to obtain table layout data 304 associated with a particular database table. Each query script 302A-B may identify the particular table stored within the database 121. For example, a query script may be generated in accordance with a structured query language. Other query languages may also be used.

Figure 4:
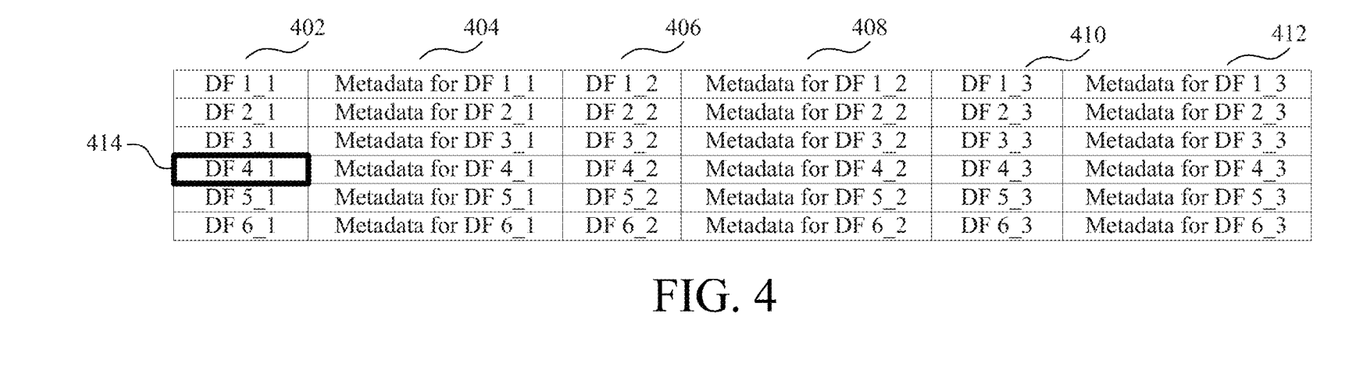
FIG. 4 illustrates an example of a database table, in accordance with example embodiments.

An example database table 400 is shown in FIG. 4 and includes columns 402-412. Each of columns 402-412 may include one or more data fields, and each field may include a data element. For example, column 402 includes data fields DF 1_1 to DF 6_1, column 406 includes data fields DF 1_2 to DF 6_2, and column 410 includes data fields DF 1_3 to DF 6_3. Data field 414 has been bolded to call out a single data field. Table 400 may also include metadata describing some or all of the data fields. For instance, column 404 includes metadata for data fields DF 1_1 to DF 6_1, column 408 includes metadata for data fields DF 1_2 to DF 6_2, and column 412 includes metadata for data fields DF 1_3 to DF 6_3. Metadata may include information describing a data element within a data field. Metadata may include, for example, information describing one or more of a name of the data field (e.g., account number, customer name, home address, and the like), a format of a data element included in the data field, and a description field providing a textual description of the data field (e.g., "this database field includes an account number of a customer's checking account"), and the like.

Table layout data 304 may identify how table 400 is organized. For example, table 400 may include a fixed number of columns, and an arbitrary number of rows in each column. The number of rows may vary from column to column based on the number of data fields added to a particular column. Each column may have a differing number of rows compared to the other columns, or two or more columns may have the same number of rows. Table layout data 304 may generally identify the content of each column. For example, a first column may include customer name data, a second column may include account number data, a third column may include balance data, and the like.

Log data 306 may provide a time history identifying each time each data field was accessed, a usage history indicating how many times each data field was accessed, and an access history identifying each user and/or organization that accessed any of the data fields.

Time history, for example, may identify the time at which each data field of table 400 was accessed, including the time each data field of table 400 was last accessed. For example, time history may indicate that data field 414 was queried on Jun. 2, 2009 at 10:30 AM, on Apr. 21, 2010 at 11:45 AM, and on Oct. 12, 2011 at 9:42 AM.

Usage history, for example, may include a count identifying how many times each data field was accessed. For example, usage history may indicate that data field 414 has been accessed 17 times.

Access history, for example, may identify each user who accessed a particular data element, as well as any organizational information associated with each user. Organizational information may identify a title of a user (e.g., vice president, manager, accountant, and the like) as well as within what part of the organization the user is associated (e.g., accounting department, sales department, and the like). For example, access history may indicate that data field 414 was accessed by user 52 of the sales department, user 98 of the account department, and user 217 of the marketing department.

Computing device 101 may execute a statistical analysis script 308 to process table layout data 304 and log data 306 for managing table 400. Statistical analysis script 308 may provide information for monitoring data security, determining for which data field(s) to provide metadata, determining usage of the data fields, determining for which fields to authorize performance of quality review, and determining where to store data elements included in the data fields. Example output of the statistical analysis script 308 is shown in FIGS. 5-8.

Figure 5:
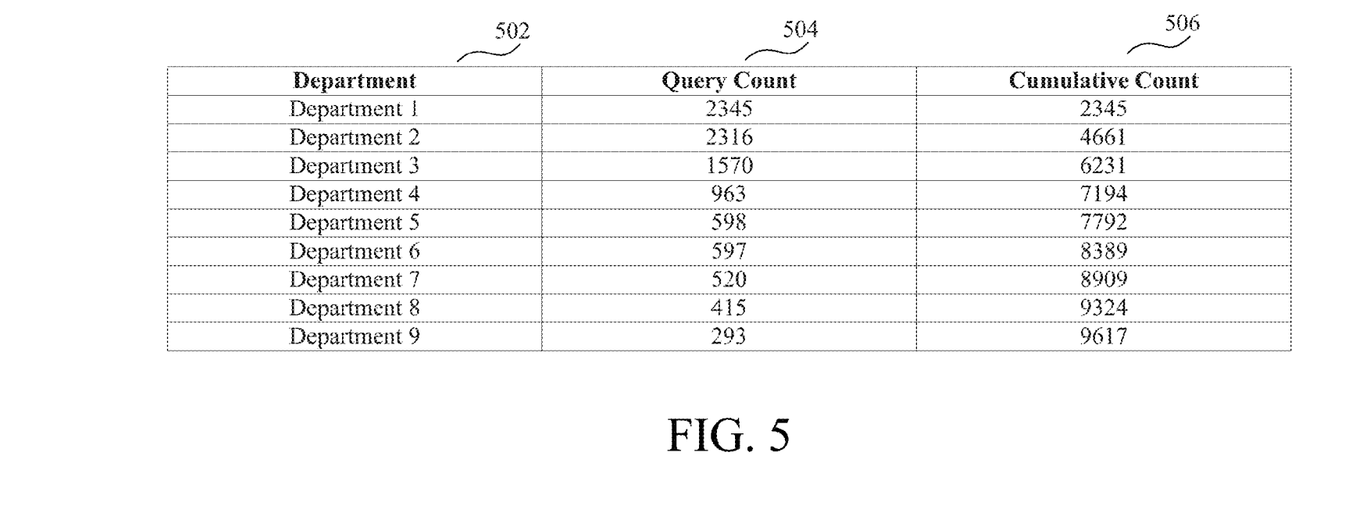
FIG. 5 illustrates an example chart providing usage information based on which departments have been accessing a particular table stored in a database, in accordance with example embodiments.

FIG. 5 illustrates an example chart providing usage information based on which departments have been accessing a particular table stored in a database, in accordance with example embodiments. Column 502 may identify at least some of the departments that have been accessing table 400. Column 504 may include a query count identifying the number of times that each department has queried table 400. For instance, Department 1 made 2345 queries of table 400, Department 2 made 2316 queries of table 400, and so forth. Column 502 may be ranked so that the department having the largest query count is listed first, the department having the next largest query count is listed next, and so forth. Column 506 may identify a cumulative count that is a sum of query count values from a corresponding row and those rows above. For example, in the row including department 3, the cumulative count is 6231 (i.e., 2345+2316+1570).

Figure 6:
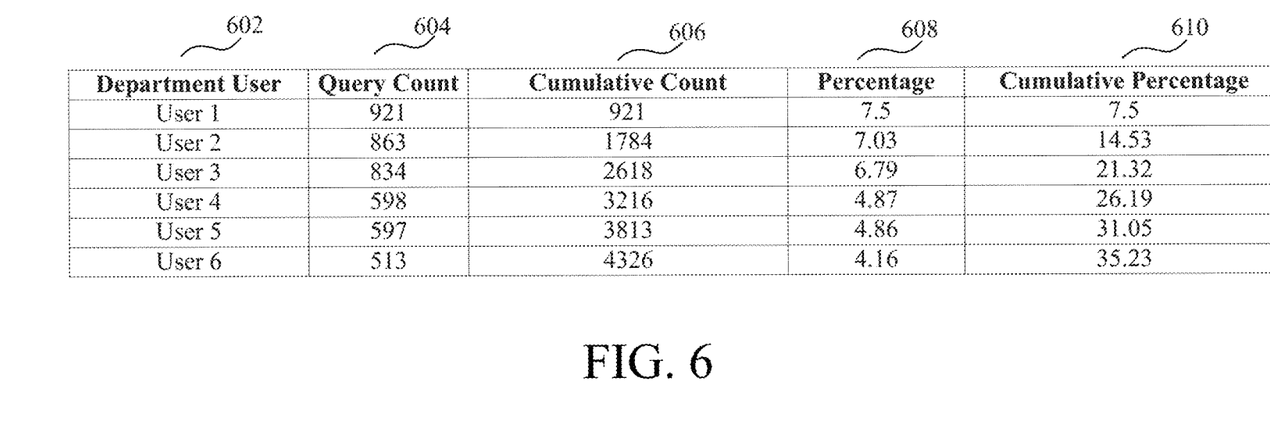
FIG. 6 illustrates an example chart providing usage information based on individual users that have been accessing a particular table stored in a database, in accordance with example embodiments.

FIG. 6 illustrates an example chart providing usage information based on individual users that have been accessing a particular table stored in a database, in accordance with example embodiments. Column 602 may identify at least some of the users that have been accessing table 400. Column 604 may include a query count identifying the number of times that each user has queried table 400. For instance, User 1 made 921 queries of table 400, User 2 made 863 queries of table 400, and so forth. Column 602 may be ranked so that the user having the largest query count is listed first, the user having the next largest query count is listed next, and so forth. Column 606 may identify a cumulative count that is a sum of query count values from a corresponding row and those rows above. For example, in the row including User 3, the cumulative count is 2618 (i.e., 921+863+834). Column 608 may identify the percentage of a total number of queries of table 400 that were issued by each user. For example, 7.5% of the total queries of table 400 were issued by User 1, 7.03% of the total queries of table 400 were issued by User 2, and so forth. Column 610 may identify a cumulative percentage that is a sum of percentage values from a corresponding row and those rows above. For example, in the row including user 3, the cumulative percentage is 21.32 (i.e., 7.5+7.03+6.79).

Figure 7:
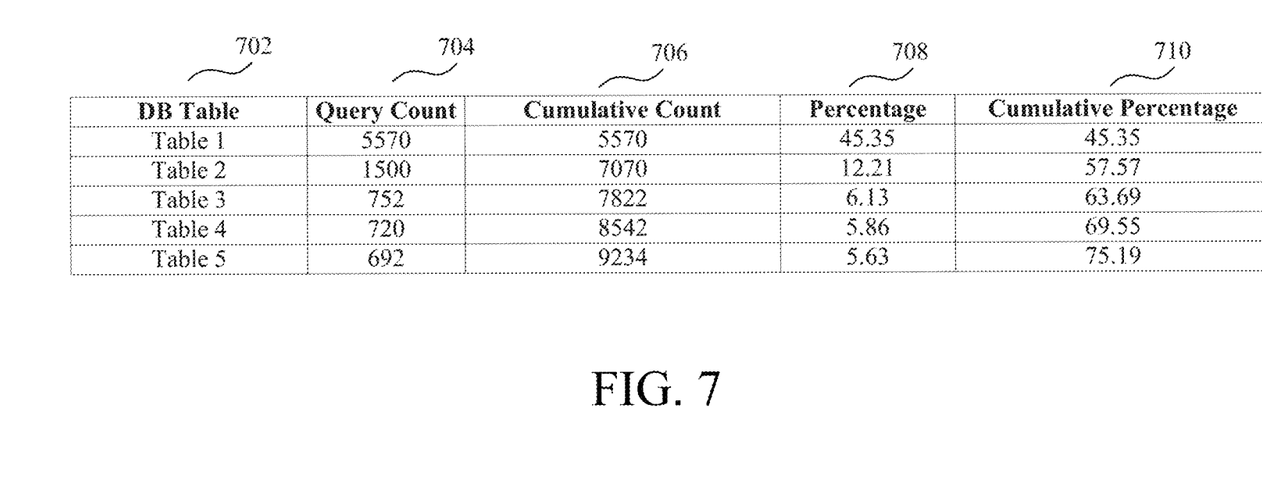
FIG. 7 illustrates an example chart providing usage information of multiple tables stored in a database, in accordance with example embodiments.

FIG. 7 illustrates an example chart providing usage information of multiple tables stored in database 121 in accordance with example embodiments. Column 702 may identify at least some of the tables stored in database 121. Column 704 may include a query count identifying the number of times that each table has been queried. For instance, Table 1 may have been queried 5570 times, Table 2 may have been queried 1500 times, and so forth. Column 702 may be ranked so that the table having the largest query count is listed first, the table having the next largest query count is listed next, and so forth. Column 706 may identify a cumulative count that is a sum of query count values from a corresponding row and those rows above. For example, in the row including Table 3, the cumulative count is 7822 (i.e., 5570+1500+752). Column 708 may identify the percentage of a total number of queries were of each table. For example, 45.35% of the total queries were of Table 1, 12.21% of the total queries were of Table 2, and so forth. Column 710 may identify a cumulative percentage that is a sum of percentage values from a corresponding row and those rows above. For example, in the row including user 3, the cumulative percentage is 63.69 (i.e., 45.35+12.21+6.12).

Figure 8:
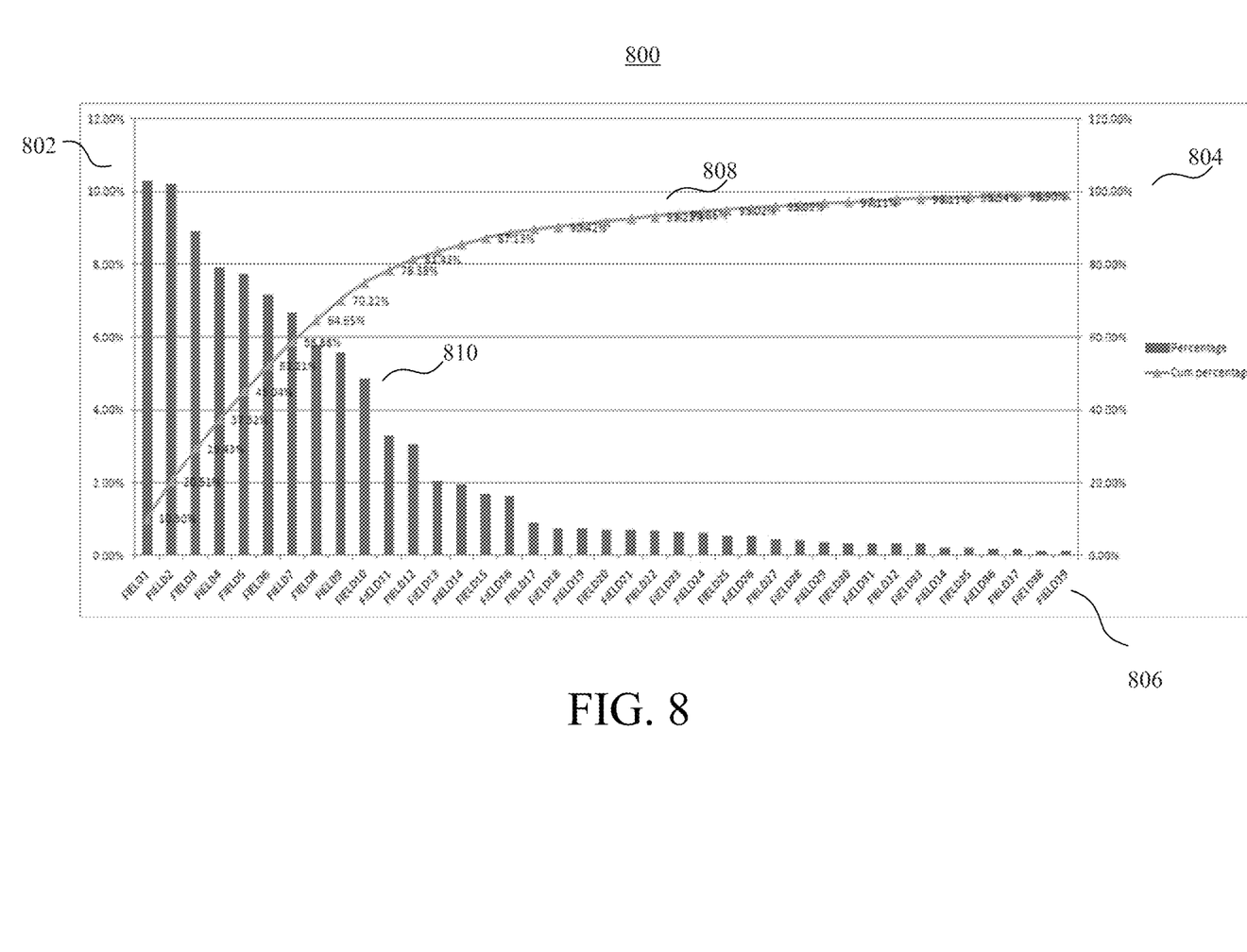
FIG. 8 illustrates an example pareto chart in accordance with example embodiments.

FIG. 8 illustrates an example pareto chart 800 in accordance with example embodiments. Computing device 101 may generate pareto chart 800 to illustrate a relationship between percentage and cumulative percentage for a particular variable (e.g., queries by multiple users of a particular table, queries of each table, and the like). For example, the relationship may be between a percentage of total queries of table 400 and cumulative percentage, as described above in FIG. 6. FIG. 8 may be used to describe other relationships between percentage and cumulative percentage, such as, for example, the relationship described in FIG. 7. In FIG. 8, Y-axis 802 lists values of percentages and Y-axis 804 lists values of cumulative percentages. X-axis 806 lists the fields in descending percentage order from left to right based on percentage. Bars associated with each of the fields indicate a percentage associated with a corresponding data field, and descend from left to right. Bar 810, for example, is associated with FIELD10 and a percentage value of approximately 4.9%. Line 808 indicates the cumulative percentage associated with the data fields, and increases from right to left until approaching a cumulative percentage of 100%. As shown in FIG. 8, bar 810 associated with FIELD10 on the X-axis 806 is associated with a cumulative percentage of 70.22% on Y-axis 804.

Computing device 101 may manage database 121 based on information derived from executing statistical analysis script 308, such as that shown in FIGS. 5-8. Computing device 101 may, for example, make determinations relating to data security, creation of metadata, determine which data fields to submit for quality review, and whether to include certain data fields in a particular data table.

For making determinations relating to data security, computing device 101 may determine which users have been accessing a particular table and whether they are authorized to do so. For example, computing device 101 may process the access history of the log data 306 indicating each user that accessed any of the data fields of table 400. Each user may be associated with a unique user identifier that is included with any query launched by that user. Computing device 101 may compare the unique user identifier to a list of users authorized to access table 400. If a particular user identifier is not on the authorized list, computing device 101 may update a security control to prevent the user associated with that user identifier from launching queries against table 400 in the future. Additionally or alternatively, computing device 101 may issue a security violation message to inform appropriate personnel that the user improperly accessed table 400.

In another example, the access history of the log data 306 may indicate which organizations have accessed any of the data elements in table 400. Each organization (e.g., department) may be associated with a unique organization identifier that is included with any query launched by a user. Computing device 101 may compare the unique organization identifier to a list of organizations authorized to access table 400. If a particular organization identifier is not on the authorized list, computing device 101 may update a security control to prevent some or all users associated with that organization identifier from launching queries against table 400 in the future. Additionally or alternatively, computing device 101 may issue a security violation message to inform appropriate personnel that a particular organization improperly accessed table 400.

In other aspects, computing device 101 may make determinations relating to creation of metadata. In some instances, creation of metadata may involve manual entry of data. This may be labor intensive and time consuming. Computing device 101 may process the usage history for table 400 to determine for which data fields to create metadata, and for which data fields not to create metadata.

In an example, computing device 101 may process the usage history to identify a subset of the data fields of table 400 that have been queried at least a predetermined number of times (e.g., 35 times), and may authorize creation of metadata for the subset, but not the remaining data fields. In another example, computing device 101 may process the usage history to identify a subset of the data fields of table 400 that have been queried at least a predetermined number of times and have been queried by at least a predetermined number of unique users, and may authorize creation of metadata for the subset, but not the remaining data fields. In yet another example, computing device 101 may process the usage history to identify a subset of the data fields of table 400 where a cumulative percentage that those fields have been accessed meets or exceeds a percentage threshold (e.g., 80% cumulative percentage), and may authorize creation of metadata for the subset, but not the remaining data fields. A time constraint may also be applied to any of the above examples. For example, the time constraint may specify that the queries must have occurred within a certain amount of time (e.g., last 6 months) to be considered.

Metadata of a table may also be periodically updated. When a metadata update is desired, computing device 101 may use the query script 302B to obtain a current version of the log data 306 that includes an updated usage history. Computing device 101 may analyze the updated usage history to determine a new subset of data fields for which to authorize the creation of metadata for the new subset using any of the methods described above. As compared to an earlier identified subset of data fields, the new subset may be unique or may overlap with data fields of the earlier identified subset.

When a new table is added to database 121, computing device 101 may control for which data fields to create metadata. In some aspects, computing device 101 may attempt to identify a table that is similar to the new table for determining which data fields to create metadata. For example, computing device 101 may process table layout data 304 of the new table to identify the structure of the new table, and may search through database 121 attempting to identify any other table stored in database 121 that includes a similar structure and/or includes at least one similar column. If a similar table is identified, computing device 101 may determine a subset of the fields of the similar table for which metadata was created. Computing device 101 may then identify the same or a similar subset of data fields in the new table. Computing device 101 may authorize creation of metadata for that subset, but not the remaining data fields, of the new table. If a similar column is identified, but not a similar table, computing device 101 may determine a subset of the fields in the similar column for which metadata was created, and identify a similar field subset in a corresponding column of the new table. Computing device 101 may thus assist in intelligent selection of data fields for which to create metadata, and may reduce creation of metadata for data fields that are rarely or infrequently accessed.

In some aspects, computing device 101 may make determinations relating to determining which data fields to submit for quality review. In some instances, data fields may be manually reviewed to determine completeness of data elements included in the data fields, compliance with formats for the data elements, and accuracy of the data elements. Performing such a review may be labor intensive and time consuming. Computing device 101 may process the usage history for table 400 to determine for which data fields to submit for quality review, and for which data fields not to review for quality.

In an example, computing device 101 may process the usage history to identify a subset of the data fields of table 400 that have been queried at least a predetermined number of times (e.g., 35 times), and may authorize performance of quality review for the subset, but not the remaining data fields. In another example, computing device 101 may process the usage history to identify a subset of the data fields of table 400 that have been queried at least a predetermined number of times and have been queried by at least a predetermined number of unique users, and may authorize quality review for the subset, but not the remaining data fields. In yet another example, computing device 101 may process the usage history to identify a subset of the data fields of table 400 where a cumulative percentage that those fields have been accessed meets or exceeds a percentage threshold (e.g., 80% cumulative percentage), and may authorize quality review for the subset, but not the remaining data fields. A time constraint may also be applied to any of the above examples. For example, the time constraint may specify that the queries must have occurred within a certain amount of time (e.g., last 6 months) to be considered.

Data fields may be periodically reviewed for quality. When a data quality review of table 400 is desired, computing device 101 may use the query script 302B to obtain a current version of the log data 306 that includes an updated usage history. Computing device 101 may analyze the updated usage history to determine a new subset of data fields for which to authorize quality review for the new subset using any of the methods described above. As compared to an earlier identified subset of data fields, the new subset may be unique or may overlap with data fields of the earlier identified subset.

When a new table is added to database 121, computing device 101 may control for which data fields to authorize quality review. In some aspects, computing device 101 may attempt to identify a table that is similar to the new table for determining which data fields to authorize quality review. For example, computing device 101 may process table layout data 304 of the new table to identify the structure of the new table, and may search through database 121 attempting to identify any other table stored in database 121 that includes a similar structure and/or includes at least one similar column. If a similar table is identified, computing device 101 may determine a subset of the fields of the similar table for which quality review was authorized. Computing device 101 may then identify the same or a similar subset of data fields in the new table. Computing device 101 may authorize quality review for that subset, but not the remaining data fields, of the new table. If a similar column is identified, but not a similar table, computing device 101 may determine a subset of the fields in the similar column for quality review was authorized, and identify a similar field subset in a corresponding column of the new table. Computing device 101 may thus assist in intelligent selection of data fields for which to authorize quality review, and may avoid performing quality review of data fields that are rarely accessed.

In further aspects, computing device 101 may make determinations about which data fields to include in table 400, and which to remove, to enhance performance of database 121. In an example, computing device 101 may process the time history of log data 306 to identify a subset of the data fields that have not been queried at least for a predetermined amount of time. Computing device 101 may exclude that subset from table 400, or may create a new table excluding that subset. In some examples, computing device 101 may transfer data of the subset to a long term storage device, and may delete the subset from table 400. The predetermined time period may be adjusted based on cumulative percentage. For example, computing device 101 may determine a point in time within which a certain cumulative percentage (e.g., 80%) of the data fields have been accessed at least once. Computing device 101 may then identify a subset of data fields that have not been accessed during the time interval between a current time and the determined point in time, and may remove that subset from the table 400. For example, computing device 101 may determine that 80% of data fields in table 400 have been accessed at least once within the past 272 days. Computing device 101 may remove data fields from table 400 that have not been accessed within the past 272 days. Thus, computing device 101 may remove infrequently accessed data fields from table 400. Computing device 101 may cause the removed subset of data fields to be stored in another storage device, or alternatively may create a new table excluding the subset.

Figure 9:
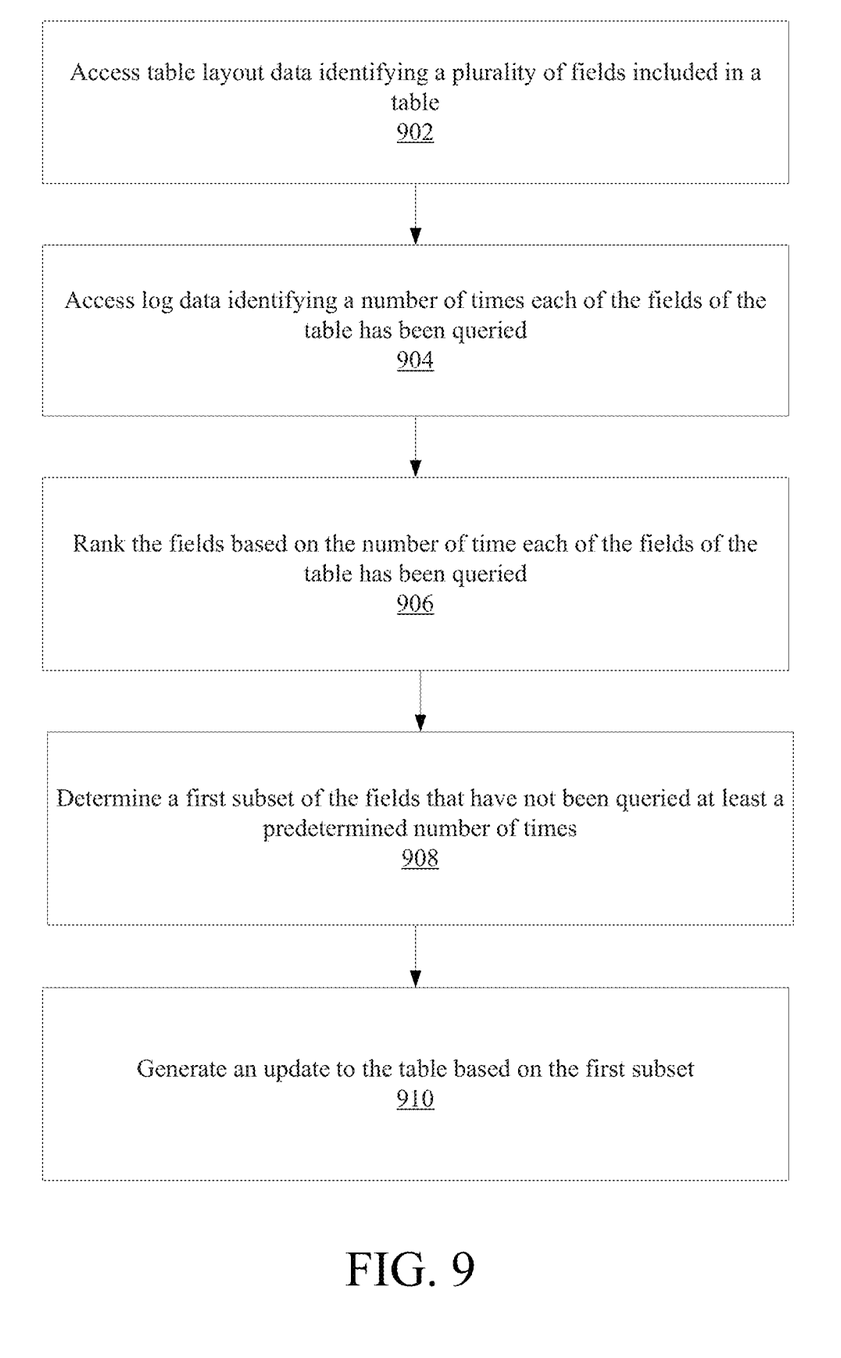
FIG. 9 illustrates an example flow diagram of a method, in accordance with example embodiments.

FIG. 9 illustrates an example flow diagram of a method, in accordance with example embodiments. The method may be implemented by a single apparatus such as, for example, a computer, server, or other computational device. In other aspects, the method may be performed by multiple devices (e.g., multiple computers, multiple processors, and the like). One or more non-transitory computer readable medium may also store computer readable instructions that, when executed by at least one processor, may cause at least one apparatus to perform the method. The order of the blocks shown in FIG. 9 is an example. The blocks may be arranged in other orders, each function described in each block may be performed one or more times, some blocks may be omitted, and/or additional blocks may be added. The method may begin at block 902.

In block 902, the method may include accessing table layout data identifying a plurality of fields included in a database table stored in a database. In an example, computing device 101 may issue a query script 302B to retrieve table layout data 304 indicating a structure of data fields included in table 400.

In block 904, the method may include accessing log data identifying a number of times each of the fields of the table has been queried. In an example, computing device 101 may issue a query script 302A to retrieve log data 306 indicating a number of times that each of the data fields in table 400 has been queried.

In block 906, the method may include ranking the fields based on the number of times each of the fields of the table has been queried. In an example, computing device 101 may rank the data fields of table 400 from a greatest number of queries to a least number of queries based on the number of times each of the fields of the table has been queried. Ranking may be used to determine which data fields are frequently accessed as well as data fields that are infrequently accessed. In an example, computing device 101 may identify data fields that are frequently accessed (e.g., more than a predetermined number of times) and for which metadata has not been generated, and to initiate generation of metadata for those data fields. In another example, computing device 101 may identify data fields that are frequently accessed (e.g., more than a predetermined number of times) and to authorize for those data fields to be reviewed for quality.

In block 908, the method may include determining a first subset of the fields that have not been queried at least a predetermined number of times. In an example, computing device 101 may determine a first subset of the data fields of table 400 that have not been queried at least a predetermined number of times (e.g., 35 times). A time constraint to the predetermined number of queries may be applied. For example, computing device 101 may determine a first subset of the data fields of table 400 that have not been queried at least a predetermined number of times (e.g., 35 times) within the last 6 months.

In block 910, the method may include generating an update to the table based on the subset. In an example, computing device 101 may remove the first subset of the data fields of table 400 to update table 400. In some examples, computing device 101 may store the first subset in a long term storage device or medium prior to removing (e.g., deleting) the first subset from table 400. The method may end, may return to any of the preceding steps, or may repeat one or more times.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments.

The invention claimed is:

1. An apparatus, comprising:
   at least one processor; and
   at least one memory storing instructions that, when executed by the at least one processor, cause the apparatus to:
   access table layout data identifying database fields of a database table stored in a database;
   access log data identifying a number of times the database fields of the database table have been queried;
   rank the database fields of the database table based on the number of times the database fields of the database table have been queried;
   identify, from amongst the database fields of the database table, a subset of database fields that have not been queried at least a predetermined number of times; and
   remove the subset of database fields that have not been queried at least the predetermined number of times from the database table.

2. The apparatus of claim 1, wherein the instructions, when executed by the at least one processor, cause the apparatus to process the log data to determine a user identifier associated with a user that has initiated at least one query to access the database table.

3. The apparatus of claim 2, wherein the instructions, when executed by the at least one processor, cause the apparatus to determine whether the user is authorized to access the database table.

4. The apparatus of claim 3, wherein the instructions, when executed by the at least one processor, cause the apparatus to update a security control in response to determining that the user does not have authorization to access the database table.

5. The apparatus of claim 1, wherein the instructions, when executed by the at least one processor, cause the apparatus to transfer data of the subset of database fields that have not been queried at least the predetermined number of times to a long term storage device prior to removing the subset of database fields that have not been queried at least the predetermined number of times from the database table.

6. The apparatus of claim 1, wherein the instructions, when executed by the at least one processor, cause the apparatus to identify, based on the number of times the database fields of the database table have been queried, a subset of database fields that have been queried at least a predetermined minimum number of times.

7. The apparatus of claim 6, wherein the instructions, when executed by the at least one processor, cause the apparatus to identify a particular database field from amongst the subset of database fields that have been queried at least the predetermined minimum number of times based on a determination that the particular database field is not associated with metadata.

8. The apparatus of claim 7, wherein the instructions, when executed by the at least one processor, cause the apparatus to authorize manual entry of metadata for the particular database field.

9. The apparatus of claim 1, wherein the instructions, when executed by the at least one processor, cause the apparatus to:
   determine a time period within which at least a predetermined percentage of the database fields of the database table have been queried at least once;
   identify a subset of database fields that have not been queried within the time period; and
   delete the subset of database fields that have not been queried within the time period from the database table.

10. A method, comprising:
    at a computing platform comprising at least one processor and a memory:
    accessing, by the at least one processor, log data stored in the memory, the log data identifying a number of times database fields of a database table have been queried;
    ranking, by at least one processor, the database fields of the database table based on the number of times the database fields of the database table have been queried;
    identifying, by the at least one processor and from amongst the database fields of the database table, a subset of database fields that have not been queried at least a predetermined number of times and that have not been queried by at least a predetermined number of users; and
    removing, by the at least one processor, the subset of database fields from the database table.

11. The method of claim 10, comprising:
    processing, by the at least one processor, the log data to determine a user identifier associated with a user that has initiated at least one query to access the database table;
    determining, by the at least one processor, whether the user is authorized to access the database table; and
    updating, by the at least one processor, a security control in response to determining that the user does not have authorization to access the database table.

12. The method of claim 10, comprising transferring, by the at least one processor, data of the subset of database fields to a long term storage device prior to removing the subset of database fields from the database table.

13. The method of claim 10, comprising:
    identifying, by the at least one processor and based on the number of times the database fields of the database table have been queried, a subset of database fields that have been queried at least a predetermined minimum number of times; and
    authorizing, by the at least one processor and responsive to a determination that a particular database field from amongst the subset of database fields that have been queried at least the predetermined minimum number of times is not associated with metadata, manual entry of metadata for the particular database field from amongst the subset of database fields that have been queried at least the predetermined minimum number of times.

14. The method of claim 10, comprising:
    determining, by the at least one processor, a time period within which at least a predetermined percentage of the database fields of the database table have been queried at least once;
    identifying, by the at least one processor, a subset of database fields that have not been queried within the time period; and
    deleting, by the at least one processor, the subset of database fields that have not been queried within the time period from the database table.

15. One or more non-transitory computer-readable media having instructions stored thereon that, when executed by one or more computers, cause the one or more computers to:
    access log data of a database, the log data identifying a number of times database fields included in a database table stored in the database have been queried;
    rank the database fields included in the database table stored in the database based on the number of times the database fields included in the database table stored in the database have been queried;

identify, from amongst the database fields included in the database table, a subset of database fields that have not been queried at least a predetermined number of times; and remove the subset of database fields that have not been queried at least the predetermined number of times from the database table stored in the database.

16. The one or more non-transitory computer-readable media of claim 15, wherein the instructions, when executed by the one or more computers, cause the one or more computers to:
   process the log data to determine a user identifier associated with a user that has initiated at least one query to access the database table;
   determine whether the user is authorized to access the database table; and
   update a security control in response to determining that the user does not have authorization to access the database table.

17. The one or more non-transitory computer-readable media of claim 15, wherein the instructions, when executed by the one or more computers, cause the one or more computers to transfer data of the subset of database fields that have not been queried at least the predetermined number of times to a long term storage device prior to removing the subset of database fields that have not been queried at least the predetermined number of times from the database table stored in the database.

18. The one or more non-transitory computer-readable media of claim 15, wherein the instructions, when executed by the one or more computers, cause the one or more computers to:
   identify, based on the number of times the database fields included in the database table stored in the database have been queried, a subset of database fields that have been queried at least a predetermined minimum number of times; and
   responsive to a determination that a particular database field of the subset of database fields that have been queried at least the predetermined minimum number of times is not associated with metadata, authorize manual entry of metadata for the particular database field of the subset of database fields that have been queried at least the predetermined minimum number of times.

19. The one or more non-transitory computer-readable media of claim 15, wherein the instructions, when executed by the one or more computers, cause the one or more computers to:
   determine a time period within which at least a predetermined percentage of the database fields included in the database table stored in the database have been queried at least once;
   identify, from amongst the database fields included in the database table stored in the database, a subset of database fields that have not been queried within the time period; and
   delete the subset of database fields that have not been queried within the time period from the database table stored in the database.

* * * * *